US011959329B2

(12) United States Patent
Lee

(10) Patent No.: US 11,959,329 B2
(45) Date of Patent: Apr. 16, 2024

(54) INSTALLATION STRUCTURE OF ELASTIC GASKET ATTACHED AND INSTALLED AS SEALING MEMBER TO GLASS-SUPPORTING INSULATION BRACKET IN SLIDING WINDOW HAVING TWO-SIDE SUPPORTING FRAME WINDOW CHASSIS

(71) Applicant: FILOBE CO., LTD., Gyeongsan-si (KR)

(72) Inventor: Kwang-Seog Lee, Daegu (KR)

(73) Assignee: FILOBE CO., LTD., Daegu (KR)

( * ) Notice: Subject to any disclaimer, the term of this patent is extended or adjusted under 35 U.S.C. 154(b) by 0 days.

(21) Appl. No.: 17/761,573

(22) PCT Filed: Sep. 22, 2019

(86) PCT No.: PCT/KR2019/012232
§ 371 (c)(1),
(2) Date: Mar. 17, 2022

(87) PCT Pub. No.: WO2021/054501
PCT Pub. Date: Mar. 25, 2021

(65) Prior Publication Data

US 2022/0341252 A1 Oct. 27, 2022

(51) Int. Cl.
*E06B 3/263* (2006.01)
*E06B 7/23* (2006.01)

(52) U.S. Cl.
CPC .......... *E06B 3/26347* (2013.01); *E06B 7/231* (2013.01)

(58) Field of Classification Search
CPC ................. E06B 7/231; E06B 3/26347; E06B 2003/26332; E06B 3/469
See application file for complete search history.

(56) References Cited

U.S. PATENT DOCUMENTS 11,313,171 B2 * 4/2022 Lee ..................... E05D 15/0686
2010/0242365 A1 * 9/2010 Langner ............. E05D 15/0686 49/404

FOREIGN PATENT DOCUMENTS

KR 1018074650000 * 11/2017

OTHER PUBLICATIONS

KR1018074650000 English translation from WIPO (Year: 2017).*

* cited by examiner

*Primary Examiner* — Janet M Wilkens
*Assistant Examiner* — Susan M. Heschel
(74) *Attorney, Agent, or Firm* — Neifeld IP Law PLLC

(57) ABSTRACT

The present invention relates to an installation structure of an elastic gasket attached and installed as a sealing member to a moving window glass supporting insulation bracket in a sliding window having a two-sided supporting frame window chassis, and more specifically, it relates to an installation structure of a sealing member (e.g. an elastic gasket) that is installed to provide a sealing function between a glass supporting insulation bracket that directly supports a glass panel of the moving window from the top or bottom and a window frame provided with a sliding rail, when opening and closing the sliding window having only two-sided supporting frame that support both sides of the glass window constituting the sliding window.

4 Claims, 5 Drawing Sheets

[ a-a' section ]

[ b-b' section ]

[ a-a' section ]

[ b-b' section ]

[ a-a' section ]

INSTALLATION STRUCTURE OF ELASTIC GASKET ATTACHED AND INSTALLED AS SEALING MEMBER TO GLASS-SUPPORTING INSULATION BRACKET IN SLIDING WINDOW HAVING TWO-SIDE SUPPORTING FRAME WINDOW CHASSIS

TECHNICAL FIELD

The present invention relates to an installation structure of an elastic gasket attached and installed as a sealing member to a moving window glass supporting insulation bracket in a sliding window having a two-sided supporting frame window chassis. More specifically, it relates to an installation structure of a sealing member (e.g. an elastic gasket) that is installed to provide a sealing function between a glass supporting insulation bracket that directly supports a glass panel of the moving window from the top or bottom and a window frame provided with a sliding rail, when opening and closing the sliding window having only two-sided supporting frame that support both sides of the glass window constituting the sliding window.

BACKGROUND ART

In general, when a sliding window (moving window) and a fixed window of four-side supporting frame window type that support the four sides of the glass window with thick supporting frames as a movable window (sliding window) and a fixed window constituting a sliding window system are used (FIG. 1*a*), as shown in a-a' cross-sectional view (longitudinal cross-sectional view) of FIG. 1B, the sliding window system has a structure in which a roller 2*r* slides along a roller guide rail on a door frame (chassis frame) 1 by providing the roller 2*r* installed on a lower part of a window chassis 2*a* in which a glass is fitted. However, in case of such a four-side supporting frame window type, the moving window 2 can run in the transverse direction (when viewed from the front) parallel to the roller guide rails, while an outer elastic ends of an elastic gaskets 2*s*1 fitted to lower and upper ends of the window chassis of the moving window 2 supporting the glass panel 2*g* maintains the sealed state in contact with the surface of the window frame 1. Accordingly, in the case of the four-sided supporting frame window, as shown in FIG. 1*c*, it is possible to install an elastic gaskets 2*s*1 having substantially the same structure as the upper and lower elastic gaskets 2*s*1 on both side sides of the frame window as shown in FIG. 1*c*.

However, recently, as an openness of windows is emphasized, use of a two-sided supporting frame window type sliding window (refer to FIG. 2*a*) that supports only both sides of a glass window constituting a sliding window, is increasing, and in an example (see FIGS. 2*b* and 2*c*) of the sliding window of such a two-sided supporting frame window type, an aluminum chassis frame does not exist at the upper and lower portions of the window chassis of the window frame of the moving window 2, and a lower glass supporting insulation bracket 2*b* as a member (formed of an organic material such as polyamide or P.V.C.) by which the glass end is wrapped around for the purpose of preventing damage and cushioning and insulation, is provided, and then a roller 2*r* is directly coupled to the lower glass supporting insulation bracket 2*b*. Therefore, it has a structure in which the roller 2*r* slides along the roller guide rail on the window frame 1. (Meanwhile an upper structure is similar, except that there is no need to use the roller 2*r*.)

In order to provide a transverse sealing structure between the moving window of this structure and the window frame 1, mohair 1*br* is installed on an inner surface of the window frame 1 instead of installing mohair on the glass supporting insulation bracket 2*b*. In the case of the two-sided supporting frame window type, as shown in FIG. 2*c* , mohair 1*br* having substantially the same structure as the mohair 1*br* at the upper and lower sides may be installed on both side sides.

In the case of adopting a sealing structure using mohair 1*br* , a product formed with high density as mohair 1*br* must be used in many cases so that the mohair 1*br* can sufficiently seal between the window frame 1 and the moving window 2. Since the high density mohair provided for this purpose generates high frictional resistance between the glass supporting insulation bracket 2*b* during the sliding operation of the moving window, it is inconvenient that a very large force is required for manual opening and closing of the moving window when the size of the window is large. In this case, there is also a problem in that an additional motor driving device must be installed for the sliding operation of the large-scale moving window.

On the other hand, as an additional or alternative component that can prevent the frictional force from increasing by the high-density mohair 1*br* in the sealing structure (windproof, airtight, heat insulating structure) using the mohair 1*br* , as shown in FIG. 3, an elastic gasket 2*s*2 can be provided so that a fixing end of the elastic gasket is fitted to the side part of the glass supporting insulation bracket 2*b* installed on the upper or lower part of the glass panel, and so that an outer elastic end of the elastic gasket is downwardly in contact with the upper surface of the window frame 1, it is possible to achieve a sliding seal between the side surface of the glass supporting insulation bracket 2*b* and the upper surface of the window frame 1 during sliding movement of the moving window. (In FIG. 3, both the mohair 1*br* and the elastic gasket 2*s*2 are shown, but only the elastic gasket may be installed in an alternative embodiment.) Even in this structure, due to strong interfacial adhesion in an interfacing surface between the outer elastic end of the rubber elastic gasket 2*s*2 and the upper surface of the aluminum window frame 1, an inconvenience of large resistance to the sliding opening and closing operation of the movable window could not be eliminated.

Here, as a new embodiment for solving the problem of large resistance to the sliding opening and closing operation of the movable window due to an excessive adhesion at the interfacing surface according to the material interaction properties of rubber and aluminum, as shown in FIG. 4*a* of the accompanying drawings, an upper contacting end 2*s*2*b* of the elastic gasket 2*s*2 of which a fixing end 2*s*2*a* is fitted and coupled to a fitting groove 2*ba* formed on the side of the glass supporting insulation bracket 2*b* installed on the upper or lower portion of the glass panel 2*g* constituting the moving window, is arranged to support the front or rear surface of the glass panel 2*g*, and an outer elastic end 2*s*2*e* of the gasket 2*s*2 is coupled in such a manner as to cover the upper surface of the window frame 1 so as to contact downwardly the upper surface of the window frame 1, thereby the elastic gasket 2*s*2 is capable of achieving a sliding seal between the side surface of the glass supporting insulation bracket 2*b* and the upper surface of the window frame 1 during sliding movement of the moving window 2. Herein, a structure in which a plastic sliding cap 2*s*2*c* is fitted to the outer elastic end 2*s*2*e* of the gasket 2*s*2 in order to alleviate interfacial adhesion with the upper surface of the aluminum window frame 1 has been proposed. (However, FIG. 4*b* is a cross-sectional view of the left end of the moving window that is inserted into the window frame when the moving window is closed. Here, since there is aluminum chassis frame (two-sided supporting frame window), a structure to install the elastic gasket 2*s*2 on the inner side of the window frame 1, is provided.) However, even if this structure is adopted, as shown in the enlarged view shown on the left of the lower enlarged view of FIG. 4*a*, the part where the thickness of the glass panel 2*g* changes (characteristics of pair glass) or deformation of the glass supporting insulation bracket due to long-term use occurs in the side part of the glass supporting insulation bracket 2*b* and the fitting groove 2*ba* formed therein, and as a result, a problem situation in which the fixing end 2*s*2*a* of the gasket 2*s*2 is detached from the fitting groove 2*ba* is highly likely to occur. As a result, there is a limit in improving product reliability.

TECHNICAL PROBLEM

The present invention is to solve the common problems of the prior art described above. In a sliding window system having a two-sided supporting frame window, it is a basic technical problem of the present invention to provide a specially improved installation structure of the elastic gasket not only for achieving adequate sealing between the upper surface (aluminum material) of the window frame 1 and the outer elastic end of the elastic gasket (rubber material) which is attached and installed in the form of a cover as a sealing member in the width direction of the glass panel on the side of the glass supporting insulation bracket that is attached and installed to support the glass panel on the upper or lower part of the glass panel, but also preventing from strong sliding resistance due to excessive adhesion there between. In addition, it is a technical task of the present invention to provide an elastic gasket installation structure that can minimize the possibility of a problem situation in which the removal (refer to FIG. 4*a*) of the fixing end of the gasket 2*s*2*a* from the fitting groove 2*ba* occurs due to excessive deformation which occurs occur in the side portion of the glass supporting insulation bracket 2*b* and the fitting groove 2*ba* formed therein due to the change in the thickness of the glass panel 2*g* or the long-term use.

TECHNICAL SOLUTION

In order to solve the above-described technical problem, in a sliding window system having a two-sided supporting frame window, the present invention provides an installation structure of an elastic gasket that is attached and installed as a sealing member between an upper surface of a window frame 1 and a glass supporting insulation bracket 2*b* installed on an upper or lower portion of a glass panel 2*g* constituting a moving window 2, wherein the installation structure of an elastic gasket comprises:

a glass supporting insulation bracket 2*b* formed and combined with a synthetic material to support the glass panel 2*g* at the upper or lower portion of the glass panel 2*g* constituting the moving window 2 and to insulate between an inside and outside of the moving window 2, wherein the glass supporting insulation bracket 2*b* is provided with a rotating groove 2*bh* at inner corner between a side surface and a bottom surface;

a rotation fastener 2*c* of an aluminum material inserted and installed in the rotating groove 2*bh,* wherein the rotation fastener 2*c* comprises a rotation end portion 2*ca* that is rotatably fitted into the rotating groove 2*bh,* and a fitting groove 2*cb* that is formed on an outer surface extending upward beyond the side surface of the glass supporting insulation bracket 2*b;* and an elastic gasket 2*s*2 provided by fitting a plastic sliding cap 2*s*2*c* on an outer elastic end 2*s*2*e* of the gasket so as to achieve a sliding seal between the side surface of the glass supporting insulation bracket 2*b* and the upper surface of the window frame 1 during sliding movement of the moving window 2, wherein the elastic gasket 2*s*2 is formed of a rubber material and is arranged for an upper contact end 2*s*2*b* of the gasket to support the front or back surface of the glass panel 2*g* so that the fixing end 2*s*2*a* of the gasket is fitted into the fitting groove 2*cb* of the rotation fastener 2*c,* and the outer elastic end 2*s*2*e* of the gasket is engaged in such a manner as to cover the upper surface of the sash frame 1 made of aluminum in a downwardly contacting manner.

ADVANTAGEOUS EFFECTS

According to the present invention, in a sliding window having a two-sided supporting frame window chassis, by fitting a plastic sliding cap on an outer elastic end of the elastic gasket (rubber material) which is provided as a sealing member in the form of a cover in the width direction of the glass panel on the side of the glass supporting insulation bracket attached and installed to support the glass panel from the upper or lower part of glass panel of the moving window, the present invention can provides an effect of preventing the occurrence of sliding resistance due to excessive adhesion, while achieving an appropriate sealing between the upper surfaces (aluminum material) of the window frame 1.

In addition, even if a change occurs in the thickness of the glass panel 2*g* or deformation occurs in the side portion of the glass supporting insulation bracket 2*b* due to long-term use, based upon the proper rigidity and shape uniformity of the rotating fastener provided between the glass supporting insulation bracket 2*b* and the elastic gasket 2*s*2, the fixing end of the elastic gasket can maintain a constant position without being detached from the fitting groove of the rotating fastener, thereby improving the weather resistance and reliability of the product and extending its lifespan.

MODES OF THE INVENTION

Hereinafter, embodiments that are easily performed by those skilled in the art will be described in detail with reference to the accompanying drawings. However, the embodiments of the present invention may be achieved in several different forms and are not limited to the embodiments described herein.

As described above, in the sliding window improved to increase the openness of the windows, according to a preferred embodiment of the present invention as shown in FIGS. 5*a* to 6*b*, a newly improved installation structure is provided in the installation structure of an elastic gasket that is attached and installed to the glass supporting insulation bracket 2*b* supporting the glass panel 2*g* of the moving window 2 on the upper or lower in the sliding window having a window chassis with a two-sided supporting window frame, as a sealing member between the glass support insulation bracket 2*b* and the upper surface of the window frame 1.

The improved installation structure of the new elastic gasket comprises a glass supporting insulation bracket 2*b* having a special shape and a plastic sliding cap 2*s*2*c* fitted to an outer elastic end 2*s*2*e* of the existing elastic gasket 2*s*2. It is made including an elastic gasket 2*s*2, and a rotating fastener 2*c* made of an aluminum material that connects between them.

Figure 1A:
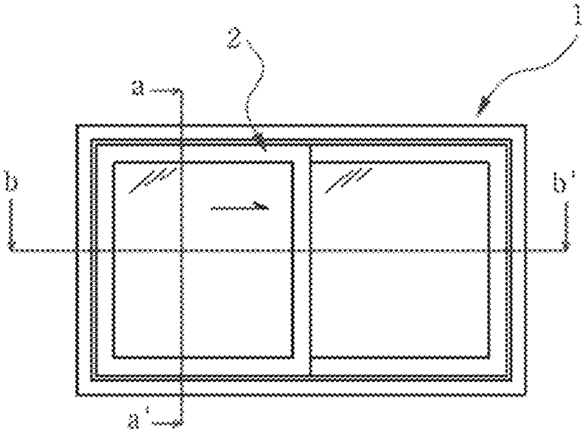
FIGS. 1*a* to 1*c* are views showing a conventional general sliding window system, showing a sliding window having a window chassis supporting glass at four sides.
Figure 1B:
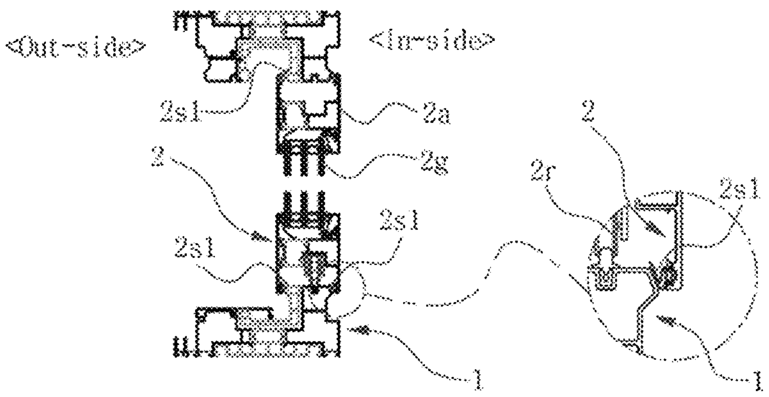
Figure 1C:
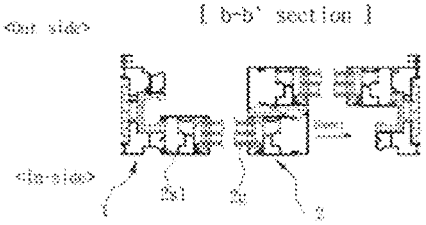
Figure 2A:
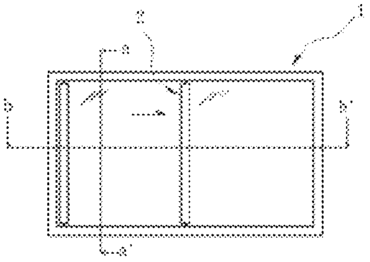
FIGS. 2*a* to 2*c* are s views showing sliding windows that improve the general sliding window system shown in FIGS. 1*a* t 1*c,* and are two-sided supporting frame windows that support only both sides of the glass windows constituting the sliding windows while openness of the windows is emphasized. Herein, they are views showing an example of a sliding window installation structure in which glass is directly placed on the upper part of the roller without an aluminum window chassis under the sliding window of the supporting frame window type.
Figure 2B:
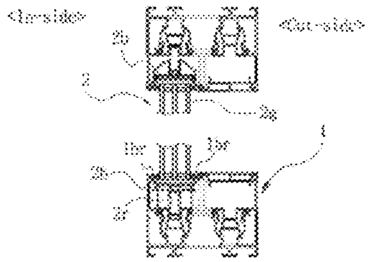
Figure 2C:
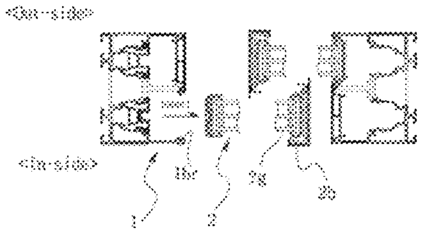
Figure 3:
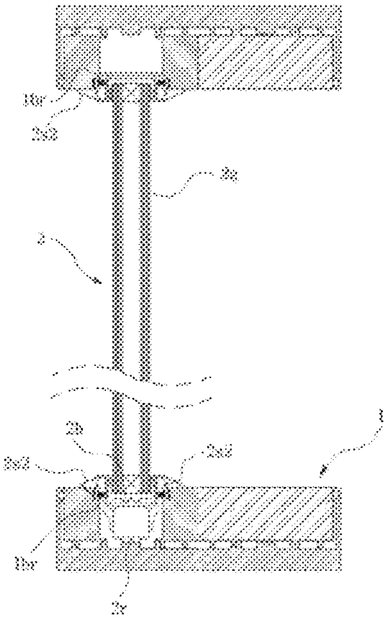
FIG. 3 is an example of a conventional improvement technique for achieving a sliding seal between the side surface of the glass supporting insulation bracket and the upper surface of the window frame during sliding movement of the moving window, by which the fixing end of the gasket is fitted to the side portion of the glass supporting insulation bracket installed on the upper or lower portion of the glass panel, and the outer elastic end of the gasket is engaged in such a manner as to cover the upper surface of the sash frame.
Figure 4A:
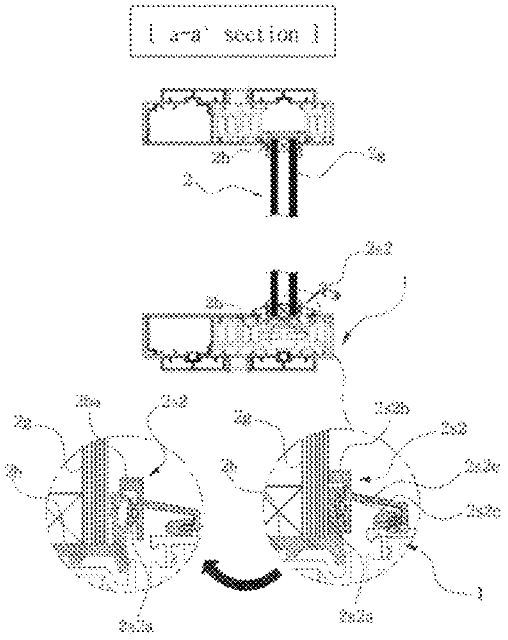
FIG. 4*a* and FIG. 4*b* are views showing a modified example for product implementation of the installation structure of the elastic gasket illustrated in FIG. 3, and are views presented to explain advantages and disadvantages thereof.
Figure 4B:
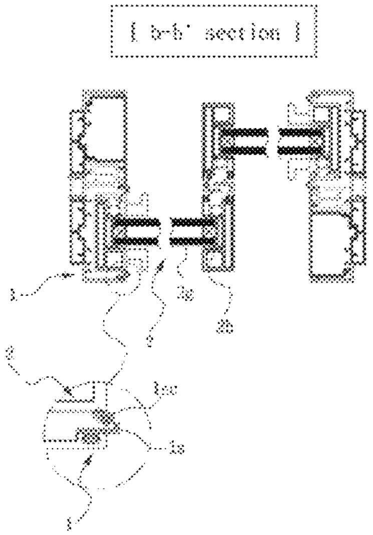
Figure 5A:
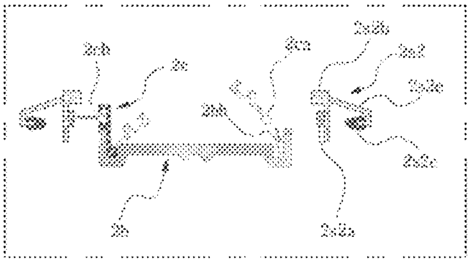
FIGS. 5*a* to 5*c* are diagrams showing the components forming a preferred embodiment of the installation structure of the elastic gasket according to the present invention and the steps of assembling and installing them in stages.

That is, as shown in FIG. 5*a*, the installation structure of the elastic gasket according to the present invention comprises:

a glass supporting insulation bracket 2*b* formed and combined with a synthetic material to support the glass panel 2*g* at the upper or lower portion of the glass panel 2*g* constituting the moving window 2 and to insulate between an inside and outside of the moving window 2, wherein the glass supporting insulation bracket 2*b* is provided with a rotating groove 2*bh* at inner corner between a side surface and a bottom surface;

a rotation fastener 2*c* of an aluminum material inserted and installed in the rotating groove 2*bh*, wherein the rotation fastener 2*c* comprises a rotation end portion 2*ca* that is rotatably fitted into the rotating groove 2*bh*, and a fitting groove 2*cb* that is formed on an outer surface extending upward beyond the side surface of the glass supporting insulation bracket 2*b*; and an elastic gasket 2*s*2 provided by fitting a plastic sliding cap 2*s*2*c* on an outer elastic end 2*s*2*e* of the gasket so as to achieve a sliding seal between the side surface of the glass supporting insulation bracket 2*b* and the upper surface of the window frame 1 during sliding movement of the moving window 2, wherein the elastic gasket 2*s*2 is formed of a rubber material and is arranged for an upper contact end 2*s*2*b* of the gasket to support the front or back surface of the glass panel 2*g* so that the fixing end 2*s*2*a* of the gasket is fitted into the fitting groove 2*cb* of the rotation fastener 2*c*, and the outer elastic end 2*s*2*e* of the gasket is engaged in such a manner as to cover the upper surface of the window frame 1 made of aluminum in a downwardly contacting manner.

Figure 5B:
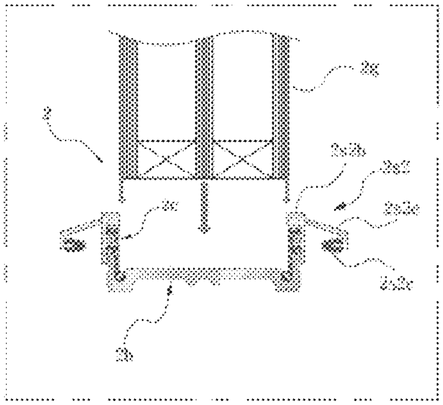
Figure 5C:
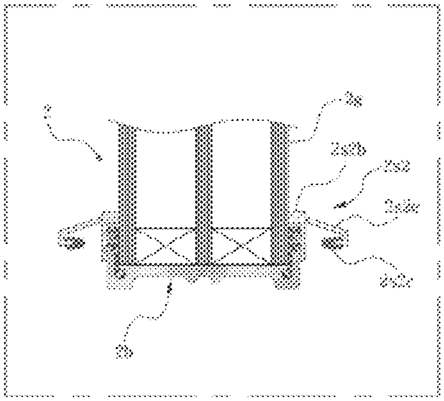
Figure 6A:
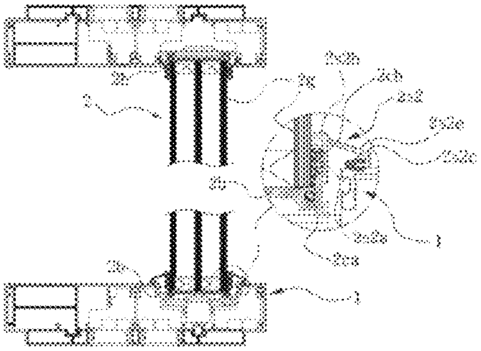
FIG. 6*a* and FIG. 6*b* are longitudinal section views (a-a' section) and cross-sectional views (b-b' section) of an elastic gasket installation structure according to a preferred embodiment of the present invention installed on a sliding window of a two-sided supporting frame window type shown in FIG. 2*a*.
Figure 6B:
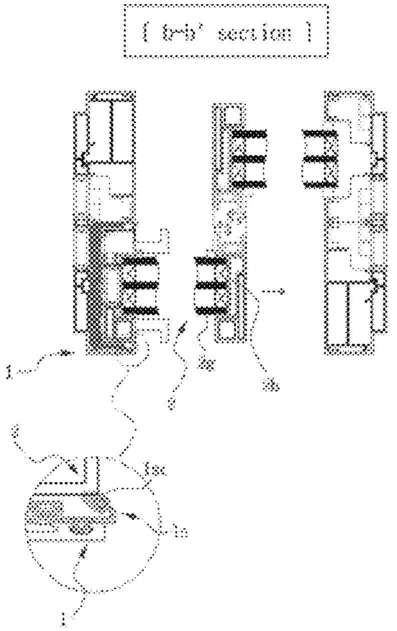

The components forming the installation structure of the elastic gasket configured in this way could form a moving window provided with the elastic gasket by going through the steps shown in FIGS. 5*a* to 5*c*, and as shown in FIGS. 6*a* to 6*b*, when a roller is mounted on the lower portion and installed on the window frame 1, the sliding cap 2*s*2*c* fitted to the outer elastic end 2*s*2*e* of the elastic gasket 2*s*2 is coupled to the surface of the window frame 1 while maintaining the sealed state in contact with the surface of the moving window, it is possible to smoothly slide in the lateral direction.

In addition, even if a change occurs in the thickness of the glass panel 2*g* or deformation occurs in the side portion of the glass supporting insulation bracket 2*b* due to long-term use, based upon the proper rigidity and shape uniformity of the rotating fastener 2*c* provided between the glass supporting insulation bracket 2*b* and the elastic gasket 2*s*2, the fixing end of the elastic gasket 2*s*2 can maintain a constant position without being detached from the fitting groove 2*cb* of the rotating fastener 2*c*.

For reference, FIG. 6*b* is a cross-sectional view showing the left end of the moving window inserted into the window frame when the moving window is closed. Here, there is an aluminum chassis frame (two-sided supporting frame window), so that a structure wherein an elastic gasket 1*s*2 is installed on the inner surface of the window frame 1, can be achieved.

In the above, while describing in detail a preferred embodiment of the present invention is applied to window having a pair of glass in which a plurality of glass panels are formed by overlapping each other by bonding with a predetermined interval and a sealing member there between to realize a vacuum in the gap. However, it should be understood that the terms of glass panels are not to be constructed as limiting the scope of the present invention, and various modifications and improvements by those skilled in the art using the basic concept of the present invention defined in the following claims are also within the scope of the present invention.

The invention claimed is:

1. An installation structure of an elastic gasket that is attached and installed as a sealing member between an upper surface of a window frame and a glass supporting insulation bracket installed on an upper or lower portion of a glass panel constituting a moving window in a sliding window system having a two-sided supporting frame window, wherein the installation structure of the elastic gasket comprises:

a glass supporting insulation bracket to support the glass panel at the upper or lower portion of the glass panel constituting the moving window and to insulate between an inside and outside of the moving window, wherein the glass supporting insulation bracket is provided with a rotating groove at an inner corner between a side surface and a bottom surface;

a rotation fastener of an aluminum material inserted and installed in the rotating groove, wherein the rotation fastener comprises a rotation end portion that is rotatably fitted into the rotating groove, and a fitting groove that is formed on an outer surface extending upward beyond the side surface of the glass supporting insulation bracket; and an elastic gasket provided by fitting a plastic sliding cap on an outer elastic end of the gasket so as to achieve a sliding seal between the side surface of the glass supporting insulation bracket and the upper surface of the window frame during sliding movement of the moving window, wherein the elastic gasket is formed of a rubber material and is arranged for an upper contact end of the gasket to support the front or back surface of the glass panel so that the a fixing end of the gasket is fitted into the fitting groove of the rotation fastener, and the outer elastic end of the gasket is engaged in such a manner as to cover the upper surface of the sash frame made of aluminum in a downwardly contacting manner.

2. An installation structure of an elastic gasket that is attached and installed as a sealing member between an upper surface of a window frame made of aluminum and a glass supporting insulation bracket installed on an upper portion or a lower portion of a glass panel constituting a moving window in a sliding window system having a two-sided supporting frame window, wherein the installation structure of the elastic gasket comprises:

a glass supporting insulation bracket configured to support the glass panel at the upper or the lower portion of the glass panel and to insulate between an inside and outside of the moving window;

wherein the bracket defines a bracket side surface and a bracket bottom surface;

wherein the bracket side surface has an upward extent;

wherein the glass supporting insulation bracket is provided with a rotating groove at an inner corner between bracket side surface and the bracket bottom surface;

a rotation fastener of an aluminum material, wherein the rotation fastener comprises a rotation end portion that is rotatably fitted into the rotating groove;

wherein of the rotation fastener extends upward from the rotation end portion to a rotation fastener top surface, and the rotation top surface is above the upward extent of the bracket side surface;

wherein the rotation fastener defines a fitting groove in a region of the rotation fastener that extends upward beyond the upward extent of the bracket side surface;

an elastic gasket made of a rubber material;

wherein the elastic gasket has surfaces defining an upper contact end, a fixing end, and an outer elastic end;

wherein the upper contact end is configured to support a front or a back surface of the glass panel;

wherein the fixing end is configured to fit in the fitting groove and is in the fitting groove;

a plastic sliding cap;

wherein the plastic sliding cap is fit on the outer elastic end;

wherein the outer elastic end is engaged in such a manner as to cover the upper surface of the window frame in a downwardly contacting manner, thereby providing a sliding seal between the bracket side surface and the upper surface of the window frame during sliding movement of the moving window.

3. The structure of claim 2, wherein the rotation fastener has a rotation fastener side surface that extends from the rotation end portion to the rotation fastener top surface;

wherein the rotation fastener side surface is flat.

4. The structure of claim 3, wherein the rotation fastener is configures such that the rotation fastener side surface would oppose a side surface of a glass panel in the bracket.

* * * * *